United States Patent
Yoo et al.

(10) Patent No.: US 10,174,231 B2
(45) Date of Patent: Jan. 8, 2019

(54) HOT-MELT ADHESIVE COMPOSITION, PREPARATION METHOD THEREOF AND VEHICLE HEADLAMP

(71) Applicants: HYUNDAI MOBIS Co., Ltd., Seoul (KR); DAEDONG CHEMTEK CO., LTD, Gyeongsan-si (KR)

(72) Inventors: Min Keun Yoo, Yongin-si (KR); Jung Hwan Lee, Yongin-si (KR); Seong Ho Kim, Suwon-si (KR); Dongjoon Kim, Gyeongsan-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 15/710,789

(22) Filed: Sep. 20, 2017

(65) Prior Publication Data

US 2018/0118986 A1 May 3, 2018

(30) Foreign Application Priority Data

Nov. 1, 2016 (KR) .................. 10-2016-0144658

(51) Int. Cl.
| | |
|---|---|
| *C09J 157/02* | (2006.01) |
| *C08F 240/00* | (2006.01) |
| *B29C 65/48* | (2006.01) |
| *C09J 175/04* | (2006.01) |
| *C09J 175/06* | (2006.01) |
| *C09J 175/08* | (2006.01) |
| *B60Q 1/04* | (2006.01) |
| *B29L 31/30* | (2006.01) |
| *B29L 31/00* | (2006.01) |
| *B29C 65/00* | (2006.01) |

(52) U.S. Cl.
CPC ......... *C09J 157/02* (2013.01); *B29C 65/4815* (2013.01); *B60Q 1/04* (2013.01); *C08F 240/00* (2013.01); *B29C 66/12469* (2013.01); *B29C 66/1312* (2013.01); *B29C 66/542* (2013.01); *B29C 66/71* (2013.01); *B29L 2031/30* (2013.01); *B29L 2031/3055* (2013.01); *B29L 2031/747* (2013.01); *C09J 175/04* (2013.01); *C09J 175/06* (2013.01); *C09J 175/08* (2013.01); *C09J 2431/006* (2013.01); *C09J 2467/006* (2013.01); *C09J 2471/006* (2013.01)

(58) Field of Classification Search
CPC .............. B29C 65/4805; B29C 65/481; B29C 65/4815; B29C 66/542; C09J 175/00; C09J 175/04; C09J 175/06; C09J 175/08; C09J 2400/22
See application file for complete search history.

(56) References Cited

U.S. PATENT DOCUMENTS

| | | | | |
|---|---|---|---|---|
| 4,027,435 A * | 6/1977 | Malloy | ................... | B24D 11/06 51/295 |
| 4,985,535 A * | 1/1991 | Takada | ................... | C08G 18/12 524/77 |
| 5,516,390 A * | 5/1996 | Tomita | ................... | B29C 65/562 106/467 |
| 5,525,663 A * | 6/1996 | Oien | ....................... | C08G 18/12 524/590 |
| 5,599,895 A * | 2/1997 | Heider | ................... | C08G 18/12 528/59 |
| 2003/0114626 A1* | 6/2003 | Franken | ..................... | B27J 5/00 528/44 |
| 2004/0167295 A1* | 8/2004 | Kleineberg | ........ | C08G 18/0895 525/437 |
| 2004/0180155 A1* | 9/2004 | Nguyen-Misra | ....... | C08G 18/10 428/34 |

* cited by examiner

*Primary Examiner* — Christopher M Rodd
(74) *Attorney, Agent, or Firm* — H.C. Park & Associates, PLC

(57) ABSTRACT

A hot-melt adhesive composition comprises 35 wt % to 40 wt % of petroleum resin, 10 wt % to 14 wt % of polyester elastomer resin, 10 wt % to 14 wt % of ethylene vinyl acetate resin, 14 wt % to 19 wt % of polyether polyol, 15 wt % to 21 wt % of polyester polyol, 8 wt % to 10 wt % of methylene diphenyl diisocyanate, and 0.1 wt % to 0.5 wt % of an amine catalyst, wherein the hot-melt adhesive composition has a melt viscosity of 20,000 cps to 50,000 cps as measured at 150° C.

20 Claims, 3 Drawing Sheets

HOT-MELT ADHESIVE COMPOSITION, PREPARATION METHOD THEREOF AND VEHICLE HEADLAMP

CROSS-REFERENCES TO RELATED APPLICATIONS

This application claims priority from and the benefit of Korean Patent Application No. 10-2016-0144658, filed on Nov. 1, 2016, which is hereby incorporated by reference for all purposes as if fully set forth herein.

BACKGROUND

Field

Exemplary embodiments relate to a hot-melt adhesive composition for sealing a vehicle headlamp, a preparation method thereof, and a vehicle headlamp.

Discussion of the Background

A vehicle headlamp is a lamp attached to the front of a vehicle to light up the road ahead so that a drive can drive the vehicle safely even under dark conditions. Generally, the headlamp comprises a light source, a reflector configured to reflect light from the light source forward, and a lens configured to adjust the luminous efficiency of the reflected light. This headlamp is manufactured by assembling a lens, a lamp and a reflector, but the assembling has a shortcoming since moisture and fine particles may enter the gaps between the assembled components to cause condensation so as to reduce luminous efficiency.

The above information disclosed in this Background section is only for enhancement of understanding of the background of the inventive concepts. Therefore, it may contain information that does not form the prior art that was already known to a person of ordinary skill in the art or was publically available prior to an effective filing date of subject matter disclosed herein.

SUMMARY

Exemplary embodiments provide a hot-melt adhesive composition for a vehicle headlamp, which has excellent initial adhesion, initial adhesive strength, initial tack and heat resistance and, at the same time, has excellent workability, exhibits excellent anti-bubbling and crosslinking abilities after curing, is effectively cured within a short time, and exhibits excellent impact resistance after curing, and a method for preparing the same.

Another object of the present disclosure is to provide a vehicle headlamp having excellent impact resistance and durability.

An exemplary embodiment discloses a hot-melt adhesive composition, including 35 wt % to 40 wt % of petroleum resin, 10 wt % to 14 wt % of polyester elastomer resin, 10 wt % to 14 wt % of ethylene vinyl acetate resin, 14 wt % to 19 wt % of polyether polyol, 15 wt % to 21 wt % of polyester polyol, 8 wt % to 10 wt % of methylene diphenyl diisocyanate, and 0.1 wt % to 0.5 wt % of an amine catalyst, wherein the hot-melt adhesive composition has a melt viscosity of 20,000 cps to 50,000 cps as measured at 150° C.

Another exemplary embodiment also discloses a method for preparing a hot-melt adhesive composition, including: melting a mixture of 14 wt % to 19 wt % of polyether polyol and 15 wt % to 21 wt % of polyester polyol; adding 8 wt % to 10 wt % of methylene diphenyl diisocyanate and 0.1 wt % to 0.5 wt % of an amine catalyst to the melted mixture to prepare a reaction product; and adding 35 wt % to 40 wt % of petroleum resin, 10 wt % to 14 wt % of polyester elastomer resin and 10 wt % to 14 wt % of ethylene vinyl acetate resin to the reaction product, followed by stirring.

A reaction for preparing the reaction product may be performed at a temperature in a range of 150° C. to 200° C.

The hot-melt adhesive composition may have an adhesive strength ($S_{20}$) of 55 kg$_f$/20 mm to 60 kg$_f$/20 mm as measured at 20° C., an adhesive strength ($S_{80}$) of 20 kg$_f$/20 mm to 25 kg$_f$/20 mm as measured at 80° C., and an adhesive strength ratio of 35% to 45% as calculated using the following Equation (1):

$$\text{Adhesive strength ratio (\%)} = (S_{80}/S_{20}) \times 100 \qquad (1)$$

wherein $S_{20}$ is the adhesive strength of the hot-melt adhesive composition, measured at 20° C., and $S_{80}$ is the adhesive strength of the hot-melt adhesive composition, measured at 80° C.

A ratio of the total weight of the petroleum resin, the polyester elastomer resin and the ethylene vinyl acetate resin to the total weight of the polyether polyol, the polyester polyol and the methylene diphenyl diisocyanate may be 1:0.4 to 1:1.

A weight ratio of the petroleum resin to the polyester elastomer resin to the ethylene vinyl acetate resin may be 3.5 to 4.0:1.0 to 1.4:1.0 to 1.4.

A weight ratio of the polyether polyol to the polyester polyol to the methylene diphenyl diisocyanate may be 1.4 to 1.9:1.5 to 2.1:0.8 to 1.0.

The polyether polyol may be polytetramethylene glycol, and the polyester polyol may be one or more of polyethylene adipate, polybutylene adipate, polyhexylene adipate, and polydiethylene glycol adipate.

Another exemplary embodiment also discloses a vehicle headlamp comprises a lens, a light source, and a reflector, wherein the vehicle headlamp is sealed with the above-described hot-melt adhesive composition.

Some exemplary embodiments may provide hot-melt adhesive composition for a vehicle headlamp, which has excellent initial adhesion, initial adhesive strength, initial tack and heat resistance and, at the same time, has excellent workability, exhibits excellent anti-bubbling and crosslinking abilities after curing, and is effectively cured within a short time.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the inventive concept and are incorporated in and constitute a part of this specification, illustrate exemplary embodiments, and together with the description serve to explain the principles of the inventive concept.

DETAILED DESCRIPTION OF THE ILLUSTRATED EMBODIMENTS

Figure 1:
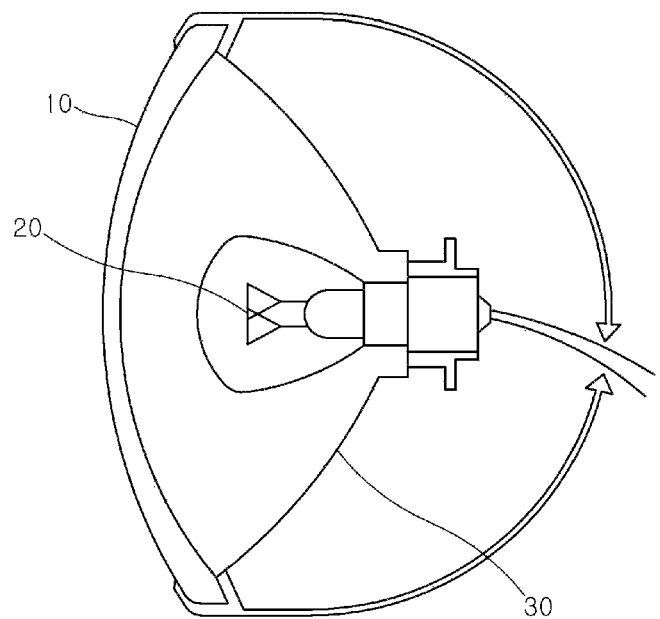
FIG. 1 shows a structure of a conventional assembled type vehicle headlamp.

Throughout the specification, like reference numerals denote like elements having the same or similar functions. Detailed description of components or functions apparent to those skilled in the art will be omitted for clarity. It should be understood that the following exemplary embodiments are provided by way of example and that the present disclosure is not limited to the exemplary embodiments disclosed herein and can be implemented in different forms by those skilled in the art. It should be noted that the drawings are not to precise scale and may be exaggerated in thickness of lines or sizes of components for descriptive convenience and clarity only.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It should be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

In recent years, a method of selectively combining and sealing a light source, a lens and a reflector has been frequently used. Sealed type headlamps typically include a semi-shield beam type headlamp obtained by sealing and attaching a lens to a reflector and separately disposing a light source (bulb), a shield beam type headlamp obtained by sealing a lens to a reflector having a light source (filament) attached directly thereto and injecting inert gas therein, and a metal back shield beam type headlamp obtained by sealing a lens to a reflector welded with a light source (bulb).

The operation of sealing the headlamp is an important operation that uses an adhesive to attach each component and, at the same time, improve sealing, thereby preventing the light-emitting efficiency of the headlamp from being reduced by external temperature changes, vibration, water penetration, particle entry or the like, and also preventing visibility from decreasing and preventing water from trapping.

Generally, hot-melt adhesives or reactive adhesives have been used for sealing of the headlamps. Conventional hot-melt adhesives, including thermoplastic resin adhesives and rubber type adhesives, have poor heat resistance, and thus high heat generated from a light source may deteriorate these adhesives and reduce the adhesive strength of the adhesives. In addition, the reactive adhesives, including polyurethane adhesives and silicone sealants, require a long curing time that leads to a low working speed and low productivity.

Accordingly, there is an increasing demand for moisture-curable reactive hot-melt adhesives combining the advantages of hot-melt adhesives and reactive adhesives. The moisture-curable reactive hot-melt adhesive has the properties of both a reactive adhesive and the hot-melt adhesive. The reactive adhesive can exhibit excellent workability and processability like the hot-melt adhesive. At the same time, the reactive adhesive can exhibit high adhesive strength and heat resistance by the curing mechanism of the reactive adhesive.

However, even in the case of such moisture-curable reactive hot-melt adhesives, it is not easy to improve initial tack and initial adhesion and improve post-cure adhesive properties at the same time. Furthermore, in order to improve the adhesive strength of conventional moisture-curable reactive hot-melt adhesives and reduce reaction time, a resin such as polyurethane is added after completion of polymerization, or a chain extender and a coupling agent are used to provide a polyurethane prepolymer. However, this method may have shortcomings since it is difficult to simultaneously improve initial tack, reactivity and workability and the processing cost is also increased.

An exemplary embodiment is directed to a hot-melt adhesive composition comprising 35 wt % to 40 wt % of petroleum resin, 10 wt % to 14 wt % of polyester elastomer resin, 10 wt % to 14 wt % of ethylene vinyl acetate resin, 14 wt % to 19 wt % of polyether polyol, 15 wt % to 21 wt % of polyester polyol, 8 wt % to 10 wt % of methylene diphenyl diisocyanate, and 0.1 wt % to 0.5 wt % of an amine catalyst, wherein the hot-melt adhesive composition has a melt viscosity of 20,000 cps to 50,000 cps as measured at 150° C. This hot-melt adhesive composition for the vehicle headlamp has excellent initial adhesion, initial adhesive strength, initial tack and heat resistance and, at the same time, has excellent workability, exhibits excellent anti-bubbling and crosslinking abilities after curing, is effectively cured within a short time, and exhibits excellent impact resistance after curing.

As used herein, the term "resin" means one comprising one or more of monomers, oligomers, polymers, copolymers, and mixtures thereof.

The petroleum resin may be used in an exemplary embodiment to enhance the moisture-blocking and adhesive properties of the hot-melt adhesive composition to thereby improve the sealing properties of the adhesive composition after curing. Specifically, the petroleum resin may comprise one or more of aliphatic petroleum resins, aromatic petroleum resins and alicyclic petroleum resins, which have 1 to 20 carbon atoms. In this case, the petroleum resin may further improve the initial tack and adhesive properties of the hot-melt adhesive composition.

In an exemplary embodiment, the petroleum resin may comprise an aliphatic petroleum resin having 5 to 9 carbon atoms. In this case, the initial tack of the hot-melt adhesive composition may further be improved so that the adhesive strength by viscoelastic properties and workability of the composition may further be improved.

In an exemplary embodiment, the petroleum resin may comprise an aromatic petroleum resin having 5 to 9 carbon atoms. In this case, the heat resistance and adhesive strength of the hot-melt adhesive composition may further be improved so that the composition can exhibit properties more suitable for use as an adhesive for a vehicle headlamp that generates a large amount of heat.

In an exemplary embodiment, the petroleum resin may comprise an aliphatic petroleum resin having 5 to 9 carbon atoms and an aromatic petroleum resin having 5 to 9 carbon atoms. In this case, the adhesive strength, initial tack and heat resistance of the hot-melt adhesive composition can be simultaneously improved.

The petroleum resin is contained in an amount of 35 wt % to 40 wt %. If the content of the petroleum resin in the hot-melt adhesive composition is less than 35 wt %, the composition may have low initial tack, and thus it may have low workability when it is applied to a vehicle headlamp. On the other hand, if the content of the petroleum resin is more than 40 wt %, the time taken to cure the composition may be excessively increased to reduce productivity, and the effect of improving the adhesive strength by curing (curing and bonding effect) may hardly be achieved.

The polyester elastomer resin may be used in an exemplary embodiment to improve the thermal processability of the hot-melt adhesive composition and, at the same time, impart rubbery properties by crosslinking to thereby increase the initial tack of the composition. Specifically, the polyester elastomer resin may be a polyester-based resin comprising a hard segment and a soft segment, which have different glass transition temperatures. In this case, the polyester elastomer resin may further increase the workability and initial tack of the hot-melt adhesive composition at room temperature (20° C.) and, at the same time, enhance the thermal processability of the composition at high temperature (80° C.). Furthermore, the polyester elastomer resin may prevent the impact resistance of the adhesive composition from decreasing after curing.

The polyester elastomer resin is contained in an amount of 10 wt % to 14 wt %. If the content of the polyester elastomer resin in the hot-melt adhesive composition is less than 10 wt %, the initial tack at room temperature can hardly be compatible with the processability at high temperature. On the other hand, if the content of the polyester elastomer resin is more than 14 wt %, the curing reactivity of the composition may be reduced, and thus the effect of improving the adhesive strength of the composition by curing (curing and bonding effect) may hardly be achieved.

The ethylene vinyl acetate resin is used in some exemplary embodiments to adjust the viscosity of the hot-melt adhesive composition before curing and, at the same time, to impart a certain level of adhesive strength to the composition, and further to increase the moisture-blocking and adhesive properties of the adhesive composition after curing, thereby improving the sealing properties of the adhesive composition.

The ethylene vinyl acetate resin is contained in an amount of 10 wt % to 14 wt %. If the content of the ethylene vinyl acetate resin in the hot-melt adhesive composition is less than 10 wt %, the viscosity of the adhesive composition may excessively increase to reduce the workability of the composition. On the other hand, if the content of the ethylene vinyl acetate is more than 14 wt %, the crosslinking property of the adhesive composition may be reduced.

The polyether polyol used in some exemplary embodiments may react with methylene diphenyl diisocyanate to impart the properties of a reactive urethane adhesive to the hot-melt adhesive composition. In this case, the hot-melt adhesive composition can exhibit the effect of improving the adhesive strength of the composition by curing (curing and bonding effect) and, at the same time, may have excellent heat resistance and processability.

Specifically, the polyether polyol may be polytetramethylene glycol. In this case, the crosslinking and curing properties of the hot-melt adhesive composition may further be improved, and the effect of improving the adhesive strength of the composition by curing (curing and bonding effect) may further be improved. More specifically, the polyether polyol may be a polytetramethylene glycol having a weight-average molecular weight in a range of 400 g/mol to 4000 g/mol. In this case, the adhesive composition may have further improved adhesion to materials that are used for lenses and reflectors of a vehicle headlamp, for example, glass, carbonate, polypropylene and the like.

The polyether polyol is contained in an amount of 14 wt % to 19 wt %. If the content of the polyether polyol in the hot-melt adhesive composition is less than 14 wt %, the crosslinking and curing properties of the composition may be deteriorated. On the other hand, if the content of the polyether polyol is more than 19 wt %, the initial tack of the hot-melt adhesive composition may hardly be achieved, and the processability of the adhesive composition may be reduced.

The polyester polyol may be used in some exemplary embodiments to react with methylene diphenyl diisocyanate to impart the properties of a partially reactive urethane adhesive to the hot-melt adhesive composition. In this case, the effect of improving the adhesive strength of the hot-melt adhesive composition by curing (curing and bonding effect) may be achieved, and the adhesive composition may exhibit excellent heat resistance and processability.

The polyester polyol is contained in an amount of 15 wt % to 21 wt %. If the content of the polyester polyol in the hot-melt adhesive composition is less than 15 wt %, the crosslinking and curing properties of the adhesive composition may be reduced. On the other hand, if the content of the polyester polyol is more than 21 wt %, partial curing failure may occur, and the crosslinking and curing properties of the composition may be reduced.

Specifically, the polyester polyol may be one or more of polyethylene adipate, polybutylene adipate, polyhexylene adipate, and polydiethylene glycol adipate. In this case, it may advantageously react with the above-described polyether polyol and methylene diphenyl diisocyanate to form crosslinks.

The methylene diphenyl diisocyanate may be used in some exemplary embodiments to react with the above-described polyether polyol and polyester polyol to form urethane bonds. In this case, the effect of improving the adhesive strength of the hot-melt adhesive composition by curing (curing and bonding effect) may be achieved, and the adhesive composition may exhibit excellent heat resistance and processability.

The methylene diphenyl diisocyanate is contained in an amount of 8 wt % to 10 wt %. If the content of the methylene diphenyl diisocyanate in the hot-melt adhesive composition is less than 8 wt %, the effect of improving the adhesive strength of the hot-melt adhesive composition by curing (curing and bonding effect) may be reduced. On the other hand, if the content of the methylene diphenyl diisocyanate is more than 10 wt %, the proportion of unreacted methylene diphenyl diisocyanate may be excessively increased to reduce the crosslinking and adhesive properties of the adhesive composition may be reduced.

The amine catalyst may be used in some exemplary embodiments to promote the reaction of the above-described methylene diphenyl diisocyanate with the polyether polyol and the polyester polyol to thereby promote moisture curing. In this case, the curing time of the adhesive composition may be shortened while the workability of the composition may further be improved, thereby increasing productivity.

Specifically, examples of the amine catalyst include tertiary amine compounds, including triethylenediamine, N-methylmorpholine, N-dimethyl cyclohexylamine, pentamethyldiethylenetriamine, tetramethylethylenediamine, bis(dimethylaminoethyl)ether, 1-methyl-4-dimethylaminoethyl-piperazine, 3-methoxy-N-dimethylpropylamine, N-ethylmorpholine, dimethyl ethanolamine, N-cocomorpholine, N-dimethyl-N', N'-dimethyl isopropylpropylenediamine, N-diethyl-3-diethylaminopropylamine, and dimethylbenzylamine. As the amine catalyst, these amine compounds may be used alone or in combination of two or more.

The amine catalyst is contained in an amount of 0.1 wt % to 0.5 wt %. If the content of the amine catalyst in the hot-melt adhesive composition is less than 0.1 wt %, the curing reaction of the adhesive composition may be delayed to reduce the workability of the composition. On the other hand, if the content of the amine catalyst is more than 0.5 wt %, the non-uniformity of the curing reaction may increase, and thus an excessive amount of bubbles may occur. Such bubbles may reduce the post-cure impact resistance of the adhesive composition to thereby reduce the durability of the composition. In an exemplary embodiment, the amine catalyst may contained in an amount of 0.1 to 0.5 parts by weight based on a total weight of composition including petroleum resin, polyester elastomer resin, ethylene vinyl acetate resin, polyether polyol, polyester polyol and methylene diphenyl diisocyanate.

The hot-melt adhesive composition has a melt viscosity of 20,000 cps to 50,000 cps as measured at 150° C. If the hot-melt adhesive composition has a melt viscosity of less than 20,000 cps as measured at 150° C., the initial adhesion, tack, processability and workability of the composition may be reduced. On the other hand, if the hot-melt adhesive composition has a melt viscosity of more than 50,000 cps as measured at 150° C., the processability of the composition may be reduced, the occurrence of bubbles may be increased, and the composition may be difficult to uniformly apply to the sealing portion of a vehicle headlamp.

Specifically, the melt viscosity of the hot-melt adhesive composition, measured at 150° C., may be 25,000 cps to 45,000 cps, for example, 25,000 cps, 27,000 cps, 30,000 cps, 32,000 cps, 35,000 cps, 37,000 cps, 40,000 cps, 42,000 cps, 45,000 cps, or the like. In this viscosity range, the hot-melt adhesive composition may have excellent workability and, at the same time, have improved initial adhesion, initial adhesive strength and initial tack, and may also exhibit excellent anti-bubbling and crosslinking properties after curing.

The ratio of the total weight of the petroleum resin, the polyester elastomer resin and the ethylene vinyl acetate resin to the total weight of the polyether polyol, the polyester polyol and the methylene diphenyl diisocyanate may be 1:0.4 to 1:1.

In this weight ratio range, a hot-melt adhesive composition for a vehicle headlamp may be provided which has excellent initial adhesion, initial adhesive strength, initial tack and heat resistance and, at the same time, has excellent workability, exhibits excellent anti-bubbling and crosslinking abilities after curing, and is effectively cured in a short time.

The weight ratio of the petroleum resin to the polyester elastomer resin to the ethylene vinyl acetate resin may be 3.5 to 4.0:1.0 to 1.4:1.0 to 1.4. In this weight ratio range, a hot-melt adhesive composition for a vehicle headlamp may be provided which has excellent adhesion, initial tack and heat resistance and, at the same time, has excellent workability, exhibits anti-bubbling and crosslinking abilities after curing, and is effectively cured in a short time.

The weight ratio of the polyether polyol to the polyester polyol to the methylene diphenyl diisocyanate may be 1.4 to 1.9:1.5 to 2.1:0.8 to 1.0. In this weight ratio range, a hot-melt adhesive composition for a vehicle headlamp may be provided which has excellent adhesion, initial tack and heat resistance and, at the same time, has excellent workability, exhibits anti-bubbling and crosslinking properties curing, and is effectively cured in a short time.

The hot-melt adhesive composition may have an adhesive strength ($S_{20}$) of 55 kg/20 mm to 60 kg/20 mm as measured at 20° C., an adhesive strength ($S_{80}$) of 20 kg/20 mm to 25 kg/20 mm as measured at 80° C., and an adhesive strength ratio of 35% to 45% as calculated according to Equation 1.

$$\text{Adhesive strength ratio (\%)} = (S_{80}/S_{20}) \times 100$$

wherein $S_{20}$ is the adhesive strength of the hot-melt adhesive composition, measured at 20° C., and $S_{80}$ is the adhesive strength of the hot-melt adhesive composition, measured at 80° C.

The adhesive strength ($S_{20}$) measured at 20° C. may be 55 kg/20 mm to 60 kg/20 mm. In this range, the hot-melt adhesive composition may have excellent initial tack and, at the same time, exhibit excellent reactivity after curing.

The adhesive strength ($S_{80}$) measured at 80° C. may be 20 kg/20 mm to 25 kg/20 mm. In this range, the hot-melt adhesive composition may exhibit uniform curing rate while bubbles generated due to reduced flowability at reduced temperature may further be reduced.

The hot-melt adhesive composition may have an adhesive strength measured at 20° C. and an adhesive strength measured at 80° C., which are within the above-described ranges, and at the same time, have an adhesive strength ratio of 35% to 45% as calculated using Equation 1 above. In this case, the hot-melt adhesive composition may have excellent initial tack and crosslinking properties, and thus the workability of the composition may further be improved while the anti-bubbling ability thereof is further improved.

An exemplary embodiment is directed to a method for preparing the above-described hot-melt adhesive composition.

Specifically, the method for preparing the hot-melt adhesive composition comprises: melting a mixture of 14 wt % to 19 wt % of polyether polyol and 15 wt % to 21 wt % of polyester polyol; adding 8 wt % to 10 wt % of methylene diphenyl diisocyanate and 0.1 wt % to 0.5 wt % of an amine catalyst to the melted mixture to prepare a reaction product; adding 35 wt % to 40 wt % of petroleum resin, 10 wt % to 14 wt % of polyester elastomer resin and 10 wt % to 14 wt % of ethylene vinyl acetate resin to the reaction product; stirring the mixture.

Specifically, the method for preparing the hot-melt adhesive composition may comprise introducing a mixture of 14 wt % to 19 wt % of polyether polyol and 15 wt % to 21 wt % of polyester polyol into a reactor, and melting the introduced mixture to prepare a melted resin. Herein, the melting may be performed at a temperature ranging from 160° C. to 210° C. In this temperature range, deterioration of the polyol components may be reduced while the melt viscosity may be easily adjusted to a level suitable for processing.

Specifically, the method for preparing the hot-melt adhesive composition may comprise, after preparation of the melted resin, adding 8 wt % to 10 wt % of methylene diphenyl diisocyanate and 0.1 wt % to 0.5 wt % of an amine catalyst to the melted resin to prepare a reaction product. Herein, a reaction for preparing the reaction product may be performed at a temperature in a range of 100° C. to 150° C. Furthermore, the reaction for preparing the reaction product may be performed for 30 minutes to 3 hours. In the reaction temperature and reaction time ranges, the stability of the reaction product may be ensured.

Specifically, the method for preparing the hot-melt adhesive composition comprises melting 35 wt % to 40 wt % of petroleum resin, 10 wt % to 14 wt % of polyester elastomer resin and 10 wt % to 14 wt % of ethylene vinyl acetate resin at a temperature in a range of 160° C. to 210° C., and adding the above-described reaction product thereto at a temperature in a range of 150° C. to 200° C., followed by stirring. Herein, the stirring may be performed at a speed of 100 rpm to 200 rpm for 30 minutes to 3 hours. In this case, a state in which the two materials are completely mixed is set as an endpoint, and the operation is completed within the shortest possible time, thereby ensuring the stability of the hot-melt adhesive composition.

Still another exemplary embodiment is directed to a vehicle headlamp sealed with the above-described hot-melt adhesive composition. The vehicle headlamp obtained by sealing with the hot-melt adhesive composition in the exemplary embodiment, which has excellent initial adhesion, initial adhesive strength, initial tack and heat resistance and, at the same time, has excellent workability, exhibits excellent anti-bubbling and crosslinking abilities after curing, is effectively cured within a short time, and exhibits excellent impact resistance after curing. The vehicle headlamp of the exemplary embodiment has excellent impact resistance and durability.

Hereinafter, the characteristics of the hot-melt adhesive composition of some exemplary embodiments, which is used to seal a vehicle headlamp, will be described in detail with reference to the accompanying drawings.

FIG. 1 shows a conventional assembled type vehicle headlamp structure 100. This conventional assembled type vehicle headlamp structure 100 is manufactured by assembling a lens 10, a lamp 20 and a reflector 30 with one another. This assembled type vehicle headlamp structure 100 has the advantage of being easily replaced, because, for example, the lamp 20 and the reflector 30 are detachable from each other and attachable to each other. However, moisture and particles may easily enter the gap between a socket of the lamp 20 and the reflector 30 to cause condensation and reduce the luminous efficiency of the headlamp.

Figure 2:
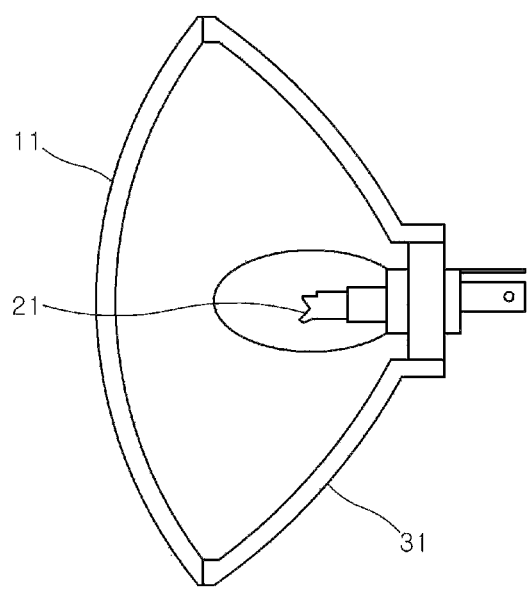
FIG. 2 shows a structure of an assembled type headlamp according to the prior art.
Figure 3:
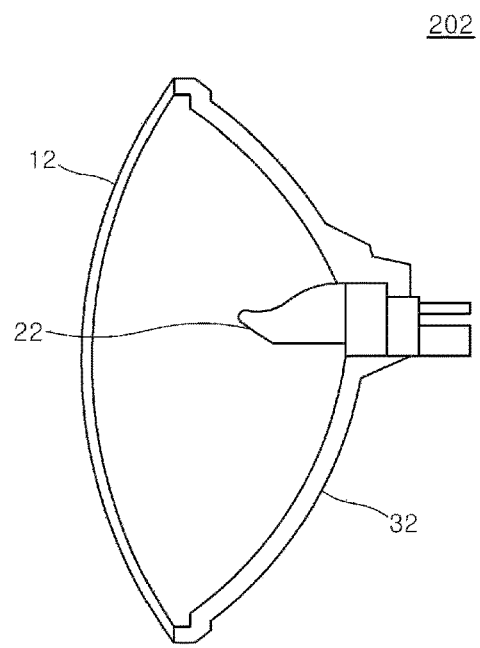
FIG. 3 shows a structure of a semi-shield beam type headlamp in accordance with an exemplary embodiment.
Figure 4:
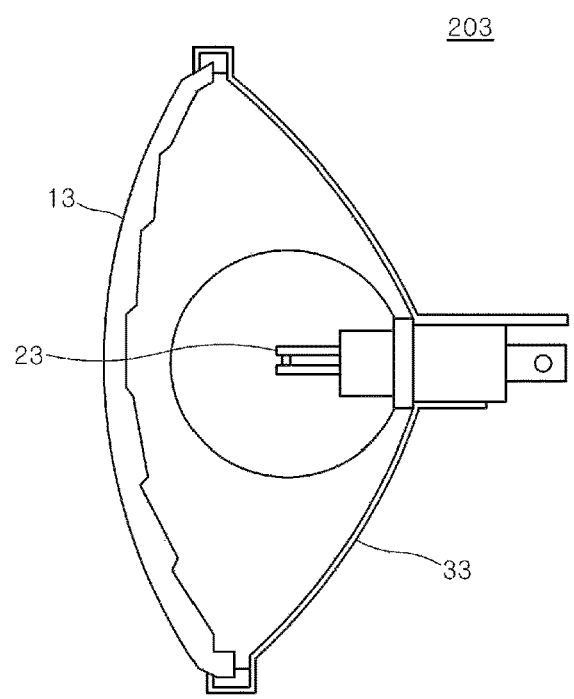
FIG. 4 shows a structure of a shield beam type headlamp in accordance with an exemplary embodiment.

For this reason, a method of selectively combining and sealing a light source, a lens and a reflector to each other has been frequently used in recent years. FIGS. 2, 3, and 4 show the structures of headlamps 201, 202 and 203 obtained using this sealing method. Headlamps obtained using this sealing method typically include the semi-shield beam type 201 obtained by sealing and attaching a lens 11 and a reflector 31 to each other and separately disposing a light source (bulb) 21. The shield beam type 202 is obtained by sealing a lens 12 to a reflector 32 having a light source (filament) 22 attached directly thereto and injecting inert gas therein. The metal back shield beam type headlamp 203 is obtained by sealing a lens 13 to a metal reflector 33 welded with a light source (bulb) 23.

The use of the hot-melt adhesive composition of an exemplary embodiment is not limited to the headlamps 201, 202 and 203 obtained using the above-described sealing method. Specifically, although the hot-melt adhesive composition is mainly used to attach a headlamp lens to a headlamp reflector which has been described herein by way of example, the hot-melt adhesive composition in an exemplary embodiment may be used regardless of the shapes and kinds of components, as long as it is used for a vehicle headlamp. For example, the hot-melt adhesive composition of an exemplary embodiment may be applied to various portions requiring a sealing operation, such as a combination of a headlamp lens and a headlamp reflector, a combination of a housing comprising a reflector and a lens, and a combination of a headlamp housing and a headlamp cover.

Figure 5:
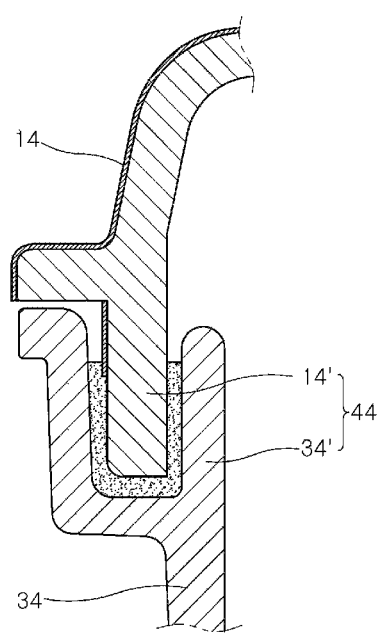
FIG. 5 shows a structure of a metal back shield beam type headlamp in accordance with an exemplary embodiment.

FIG. 5 shows an example of a connection 44 through which a lens 14 and a reflector 34 are attached to each other in a headlamp 300 using the sealing method. The shapes of the lens 14, the reflector 34 and the connection 44 therebetween are not particularly limited. FIG. 5 merely illustrates a vehicle headlamp to which an exemplary embodiment is applied.

Referred to FIG. 5, the end 14' of the lens 14 may be combined with a grooved end 34' of the reflector 34 to form the connection 44. This connection 44 is configured to physically fix the lens 14 and the reflector 34. The above-described hot-melt adhesive composition in some exemplary embodiments is applied to the grooved end 34' so as to adhere to the end 14' of the lens.

The hot-melt adhesive composition in some exemplary embodiments exhibits the properties of a hot-melt adhesive while it is cooled after application, and it undergoes a moisture-curing reaction promoted by the amine catalyst after application to form urethane crosslinks. Regarding the physical properties of the hot-melt adhesive composition of the exemplary embodiments, the adhesive composition exhibits initial adhesion according to a hot-melt adhesive mechanism (according to which the hot-melt adhesive that is flowable due to melting at high temperature reduces its flowability with decreasing temperature to form an adhesive solid) in the initial stage of adhesion. Then, the adhesive composition reacts with moisture in air or on the surface of the adherent to exhibit late adhesion according to a reactive adhesive curing mechanism. Accordingly, the adhesive composition of some exemplary embodiments has high workability due to the hot-melt adhesive mechanism and high adhesive due to the three-dimensional curing mechanism of the reactive adhesive.

As described above, some exemplary embodiments may provide a hot-melt adhesive composition which has excellent initial adhesion, initial adhesive strength, initial tack and heat resistance and, at the same time, has excellent workability, exhibits excellent anti-bubbling and crosslinking abilities after curing, is effectively cured within a short time, and exhibits excellent impact resistance after curing.

Hereinafter, an exemplary embodiment will be described in further detail with reference to preferred examples. It is to be understood, however, that these examples are for illustrative purposes only and are not intended to limit the scope of the present invention in any way.

The contents not described herein can be readily envisioned by those skilled in the art, and thus the description thereof is omitted.

Example 1

15 wt % of polyether polyol and 15 wt % of polyester polyol are introduced into a reactor, and then the contents of the reactor are heated to 160° C. and stirred at a speed of 150 rpm to melt the plasticizer. Then, 9 wt % of methylene diphenyl diisocyanate and 0.2 parts by weight of an amine catalyst are added to the heated reactor, and then reacted at 200° C. for 30 minutes. Thereafter, 40 wt % of petroleum resin, 11 wt % of polyester elastomer resin and 10 wt % of ethylene vinyl acetate resin are added to the reactor, followed by stirring at 150 rpm for 30 minutes, thereby preparing a hot-melt adhesive composition.

Examples 2 and Comparative Examples 1 to 5

Hot-melt adhesive compositions are prepared in the same manner as described in Example 1, except that components and their contents are changed as shown in Comparative (Comp.) Examples 1 to 5 Table 1 below.
Methods for Evaluating Physical Properties
(1) Melt Viscosity
Using a viscometer (Model: HBDV-II+P) equipped with a Brookfield Thermosel system, the melt viscosities of the hot-melt adhesive compositions prepared in Examples 1 and 2 and Comparative Examples 1 to 5 are measured. Specifically, 13 ml of each hot-melt adhesive composition was placed in a sample chamber and completely melted at about 150° C., and the melt viscosity thereof is measured using SC4-28 spindle.
(2) Adhesive Strengths
For measurement of adhesive strengths, two PC/PP sheet samples are prepared using each of the hot-melt adhesive compositions prepared in Examples 1 and 2 and Comparative Examples 1 to 5. The two samples are allowed to stand at 20° C. and 80° C., respectively, for 1 hour or more, and then the adhesive strengths thereof are measured using a universal testing machine (UTM).
(3) Adhesive Strength Ratio
The adhesive strength ($S_{20}$) of the hot melt adhesive composition, measured at 20° C., and the adhesive strength ($S_{80}$) of the hot-melt adhesive composition, measured at 80° C., are substituted into the Equation (1), thereby determining the adhesive strength ratio of the hot-melt adhesive composition.
(4) Anti-Bubbling Ability
Two PC/PP sheet samples are prepared using each of the hot-melt adhesive compositions prepared in Examples 1 and 2 and Comparative Examples 1 to 5. The two samples are allowed to stand at 20° C. and 80° C., respectively, for 1 hour or more, and then whether or not bubbles at the interface between PC and PP is visually evaluated according to the following criteria.
◎: excellent (no bubble occurred); x: poor (bobbles occurred).

TABLE 1

| Compositions and properties | Unit | Example 1 | Example 2 | Comp. Example 1 | Comp. Example 2 | Comp. Example 3 | Comp. Example 4 | Comp. Example 5 |
|---|---|---|---|---|---|---|---|---|
| Petroleum resin | wt % | 40 | 35 | 0 | 35 | 35 | 0 | 40 |
| Polyester elastomer | wt % | 11 | 10 | 9 | 5 | 10 | 20 | 15 |
| EVA | wt % | 10 | 10 | 0 | 10 | 10 | 20 | 15 |
| Polytetramethylene glycol | wt % | 15 | 14 | 0 | 20 | 14 | 22 | 13 |
| poly (1,6-hexylene adipate) | wt % | 15 | 21 | 79 | 20 | 21 | 22 | 13 |
| Methylene diphenyl diisocyanate (MDI) | wt % | 9 | 10 | 12 | 12 | 6 | 13 | 7 |
| Amine catalyst | Parts by weight. | 0.2 | 0.2 | 0 | 0 | 0 | 0 | 0 |
| Melt viscosity (@150° C.) | cps | 25,000 | 45,000 | 15,000 | 3,000 | 80,000 | 65,000 | 55,000 |
| Adhesive strength (@20° C.) | kg/20 mm | 58 | 60 | 100 | 55 | 45 | 62 | 40 |
| Adhesive strength (@80° C.) | kg/20 mm | 22 | 23 | 52 | 26 | 15 | 28 | 8 |
| Adhesive strength ratio ($S_{80}/S_{20}*100$) | % | 37.93 | 38.33 | 52 | 47.27 | 33.33 | 45.16 | 20 |
| Anti-bubbling ability | — | ◎ | ◎ | X | ◎ | ◎ | ◎ | ◎ |
| Crosslinking ability | — | ◎ | ◎ | ◎ | ○ | X | ○ | X |
| Workability | — | ◎ | ◎ | X | X | X | X | ◎ |
| Initial tack | — | ◎ | ◎ | X | ◎ | ◎ | X | ◎ |
| Impact resistance after curing | — | ◎ | ◎ | X | ○ | ○ | X | ◎ |

◎: excellent,
○: moderate,
X: poor

As can be seen in Table 1 above, the hot-melt adhesive compositions of Examples 1 and 2 in some exemplary embodiments provides an adhesive strength ratio ranging from 35% to 45% as calculated using Equation 1 above, and shows excellent anti-bubbling ability, crosslinking ability, workability, initial tack and post-cure impact resistance due to the combined synergistic effects of the components contained therein.

However, in the case of the hot-melt adhesive compositions of Comparative Examples 1 to 4, which contain no petroleum resin and in which the contents of other components are out of the ranges specified in some exemplary embodiments, a problem arose in that the workability and initial tack of the compositions were low. Furthermore, in the case of the hot-melt adhesive compositions of Comparative Examples 3 and 5, which contain the methylene diphenyl diisocyanate compound in an amount smaller than that specified in some exemplary embodiments, these composition were difficult to apply to vehicle headlamps, due to their low crosslinking ability and workability. In addition, in the case of the hot-melt adhesive composition of Comparative Example 2, which contains polyester elastomer, polytetramethylene glycol and methylene diphenyl diisocyanate compounds in amounts larger than those specified in some exemplary embodiments and which has an adhesive strength ratio higher than 45%, it is shown that the crosslinking ability is not excellent and the workability was low.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A hot-melt adhesive composition comprising:
   35 wt % to 40 wt % of petroleum resin;
   10 wt % to 14 wt % of polyester elastomer resin;
   10 wt % to 14 wt % of ethylene vinyl acetate resin;
   14 wt % to 19 wt % of polyether polyol;
   15 wt % to 21 wt % of polyester polyol;
   8 wt % to 10 wt % of methylene diphenyl diisocyanate; and
   0.1 wt % to 0.5 wt % of an amine catalyst,
   wherein the hot-melt adhesive composition has a melt viscosity of 20,000 cps to 50,000 cps as measured at 150° C.

2. The hot-melt adhesive composition of claim 1, wherein the hot-melt adhesive composition has an adhesive strength ($S_{20}$) of 55 kg$_f$/20 mm to 60 kg$_f$/20 mm as measured at 20° C., an adhesive strength ($S_{80}$) of 20 kg$_f$/20 mm to 25 kg$_f$/20 mm as measured at 80° C., and an adhesive strength ratio of 35% to 45% as calculated using an Equation 1:

$$\text{Adhesive strength ratio (\%)} = (S_{80}/S_{20}) \times 100 \quad \text{(Equation 1)}$$

wherein $S_{20}$ is the adhesive strength of the hot-melt adhesive composition and is measured at 20° C., and $S_{80}$ is the adhesive strength of the hot-melt adhesive composition and is measured at 80° C.

3. The hot-melt adhesive composition of claim 1, wherein a ratio of a total weight of the petroleum resin, the polyester elastomer resin and the ethylene vinyl acetate resin to a total weight of the polyether polyol, the polyester polyol and the methylene diphenyl diisocyanate is 1:0.4 to 1:1.

4. The hot-melt adhesive composition of claim 1, wherein a weight ratio of the petroleum resin to the polyester elastomer resin to the ethylene vinyl acetate resin is 3.5 to 4.0:1.0 to 1.4:1.0 to 1.4.

5. The hot-melt adhesive composition of claim 1, wherein a weight ratio of the polyether polyol to the polyester polyol to the methylene diphenyl diisocyanate is 1.4 to 1.9:1.5 to 2.1:0.8 to 1.0.

6. The hot-melt adhesive composition of claim 1, wherein the polyether polyol is polytetramethylene glycol, and the polyester polyol is one or more of polyethylene adipate, polybutylene adipate, polyhexylene adipate, and polydiethylene glycol adipate.

7. A method for preparing a hot-melt adhesive composition, comprising:
   melting a mixture of 14 wt % to 19 wt % of polyether polyol and 15 wt % to 21 wt % of polyester polyol;
   adding 8 wt % to 10 wt % of methylene diphenyl diisocyanate and 0.1 wt % to 0.5 wt % of an amine catalyst to the melted mixture to prepare a reaction product; and
   adding 35 wt % to 40 wt % of petroleum resin, 10 wt % to 14 wt % of polyester elastomer resin and 10 wt % to 14 wt % of ethylene vinyl acetate resin to the reaction product, followed by stirring.

8. The method of claim 7, wherein a reaction for preparing the reaction product is performed at a temperature ranging from 150° C. to 200° C.

9. The method of claim 7, wherein a ratio of a total weight of the petroleum resin, the polyester elastomer resin and the ethylene vinyl acetate resin to a total weight of the polyether polyol, the polyester polyol and the methylene diphenyl diisocyanate is 1:0.4 to 1:1.

10. The method of claim 7, wherein a weight ratio of the petroleum resin to the polyester elastomer resin to the ethylene vinyl acetate resin is 3.5 to 4.0:1.0 to 1.4:1.0 to 1.4.

11. The method of claim 7, wherein a weight ratio of the polyether polyol to the polyester polyol to the methylene diphenyl diisocyanate is 1.4 to 1.9:1.5 to 2.1:0.8 to 1.0.

12. The method of claim 7, wherein the polyether polyol is polytetramethylene glycol, and the polyester polyol is one or more of polyethylene adipate, polybutylene adipate, polyhexylene adipate, and polydiethylene glycol adipate.

13. The method of claim 7, wherein the hot-melt adhesive composition has an adhesive strength ($S_{20}$) of 55 kg$_f$/20 mm to 60 kg$_f$/20 mm as measured at 20° C., an adhesive strength ($S_{80}$) of 20 kg$_f$/20 mm to 25 kg$_f$/20 mm as measured at 80° C., and an adhesive strength ratio of 35% to 45% as calculated using an Equation 1:

$$\text{Adhesive strength ratio (\%)} = (S_{80}/S_{20}) \times 100 \quad \text{(Equation 1)}$$

wherein $S_{20}$ is the adhesive strength of the hot-melt adhesive composition and is measured at 20° C., and $S_{80}$ is the adhesive strength of the hot-melt adhesive composition and is measured at 80° C.

14. A vehicle headlamp, comprising:
   a lens;
   a light source; and
   and a reflector, wherein the vehicle headlamp is sealed with the hot-melt adhesive composition of claim 1.

15. A vehicle headlamp of claim 14, wherein the hot-melt adhesive composition has the adhesive strength ($S_{20}$) of 55 kg$_f$/20 mm to 60 kg$_f$/20 mm as measured at 20° C., the adhesive strength ($S_{80}$) of 20 kg$_f$/20 mm to 25 kg$_f$/20 mm as measured at 80° C., and the adhesive strength ratio of 35% to 45% as calculated using an Equation 1:

$$\text{Adhesive strength ratio (\%)} = (S_{80}/S_{20}) \times 100 \quad \text{(Equation 1)}$$

wherein $S_{20}$ is the adhesive strength of the hot-melt adhesive composition and is measured at 20° C., and $S_{80}$ is the adhesive strength of the hot-melt adhesive composition and is measured at 80° C.

16. The vehicle headlamp of claim 14, wherein a preparation of the hot-melt adhesive composition comprises:
   melting a mixture of 14 wt % to 19 wt % of the polyether polyol and 15 wt % to 21 wt % of the polyester polyol;
   adding 8 wt % to 10 wt % of the methylene diphenyl diisocyanate and 0.1 wt % to 0.5 wt % of an amine catalyst to the melted mixture to prepare a reaction product; and adding 35 wt % to 40 wt % of the petroleum resin, 10 wt % to 14 wt % of the polyester elastomer resin and 10 wt % to 14 wt % of the ethylene vinyl acetate resin to the reaction product, followed by stirring.

17. The vehicle headlamp of claim 16, wherein a reaction for preparing the reaction product is performed at a temperature ranging from 150° C. to 200° C.

18. The vehicle headlamp of claim 14, wherein the lens and the reflector are sealed and attached to each other, the light source is directly disposed on the reflector, and inert gas is injected in the vehicle headlamp.

19. The vehicle headlamp of claim 14, wherein the lens is sealed to a metal reflector, the metal reflector being configured to be welded with the light source.

20. The vehicle headlamp of claim 14, wherein an end of the lens is combined with a grooved end of the reflector to form a connection, the connection being configured to physically fix the lens and the reflector.

* * * * *